United States Patent
Hiemstra et al.

(10) Patent No.: US 9,205,764 B2
(45) Date of Patent: Dec. 8, 2015

(54) ROTARY RECLINER

(75) Inventors: Bruce A. Hiemstra, Ann Arbor, MN (US); Michael R. Bittner, Canton, MN (US); Ingo Kienke, Wermelskirchen (DE); Michael J. Kapusky, Milan, MN (US); Kirubaharan Albert, Burscheid (DE)

(73) Assignee: Johnson Controls Technology Company, Holland, MI (US)

( * ) Notice: Subject to any disclaimer, the term of this patent is extended or adjusted under 35 U.S.C. 154(b) by 510 days.

(21) Appl. No.: 13/386,758

(22) PCT Filed: Aug. 12, 2009

(86) PCT No.: PCT/US2009/053559
§ 371 (c)(1),
(2), (4) Date: Mar. 16, 2012

(87) PCT Pub. No.: WO2011/019346
PCT Pub. Date: Feb. 17, 2011

(65) Prior Publication Data
US 2012/0161487 A1  Jun. 28, 2012

(51) Int. Cl.
*B60N 2/02* (2006.01)
*B60N 2/225* (2006.01)
(52) U.S. Cl.
CPC ............ *B60N 2/2252* (2013.01); *B60N 2/2254* (2013.01); *Y10T 29/4978* (2015.01)
(58) Field of Classification Search
CPC ...................................................... B60N 2/2252
USPC ................................ 297/362, 216.13, 216.14
See application file for complete search history.

(56) References Cited

U.S. PATENT DOCUMENTS

| | | | |
|---|---|---|---|
| 5,590,931 A | 1/1997 | Fourrey et al. | |
| 6,805,650 B2 * | 10/2004 | Branov et al. | 475/162 |
| 8,262,165 B2 * | 9/2012 | Mitsuhashi | 297/362 |
| 8,454,092 B2 * | 6/2013 | Thiel | 297/378.11 |
| 8,672,407 B2 * | 3/2014 | Leconte et al. | 297/362 |
| 2006/0158012 A1 * | 7/2006 | Kawashima | 297/362 |
| 2006/0158013 A1 * | 7/2006 | Kawashima et al. | 297/362 |
| 2006/0158014 A1 * | 7/2006 | Kawashima | 297/362 |
| 2006/0170269 A1 | 8/2006 | Oki | |
| 2006/0220430 A1 | 10/2006 | Baloche Faurecia | |
| 2006/0279121 A1 * | 12/2006 | Matsumoto et al. | 297/362 |
| 2008/0001458 A1 * | 1/2008 | Hoshihara et al. | 297/362 |

(Continued)

FOREIGN PATENT DOCUMENTS

WO  2009064650 A1  5/2009

*Primary Examiner* — David R Dunn
*Assistant Examiner* — Alexander Harrison
(74) *Attorney, Agent, or Firm* — Dickinson Wright PLLC (57) ABSTRACT

A recliner assembly for a vehicular seat of the type including a backrest hingedly connected to a seat base and capable of being reclined. The recliner assembly includes an outer gear and includes an internal teeth arranged circumferentially about an axis A. The assembly also includes an inner gear including at least one tooth engaging member selectively moveable into and out of engagement with the internal teeth of the outer gear. A retainer is attached to the outer gear in order to retain the inner gear from lateral movement along axis A. The retainer is configured for mounting to the outer gear and the inner gear is configured for mounting to at least one of a top plate and a base plate. The retainer, outer gear, and inner gears can be formed from a fine-blanked steel material and simply welded together to improve recliner strength while reducing assembly costs.

19 Claims, 13 Drawing Sheets

(56) References Cited

U.S. PATENT DOCUMENTS

| | | |
|---|---|---|
| 2008/0185892 A1* | 8/2008 | Peters et al. .................. 297/362 |
| 2008/0238172 A1* | 10/2008 | Maeda et al. ................. 297/362 |
| 2008/0303331 A1* | 12/2008 | Heo .............................. 297/362 |
| 2009/0072605 A1 | 3/2009 | Otto et al. |
| 2009/0200850 A1* | 8/2009 | Heo .............................. 297/362 |
| 2009/0224588 A1* | 9/2009 | Matsumoto et al. .......... 297/362 |
| 2010/0013287 A1* | 1/2010 | Mitsuhashi .................... 297/362 |
| 2010/0013288 A1* | 1/2010 | Mitsuhashi .................... 297/362 |
| 2010/0194163 A1* | 8/2010 | Cha et al. ...................... 297/362 |
| 2010/0201175 A1* | 8/2010 | Okazaki et al. ............... 297/362 |
| 2011/0140493 A1* | 6/2011 | Krueger et al. ............... 297/362 |
| 2011/0140494 A1* | 6/2011 | Krueger et al. ............... 297/362 |
| 2011/0254337 A1* | 10/2011 | Jiang et al. .................... 297/362 |

\* cited by examiner

ROTARY RECLINER

CROSS-REFERENCE TO PRIOR APPLICATION

This U.S. National Stage patent application claims the benefit of International Application No. PCT/US09/053,559 filed Aug. 12, 2009, entitled "Rotary Recliner," the entire disclosure of the application being considered part of the disclosure of this application and hereby incorporated by reference.

BACKGROUND

The present invention relates to a rotary recliner for mounting an adjustable seat back to a body supporting seat cushion and in particular, to improvements in such a recliner which reduce the lateral movement between an outer and inner gear.

Rotary recliners for adjustable vehicle seats which employ a pair of mating gears, an inner gear and an outer gear rotating about a common pivot, are well known. Such recliners have a first component attached to the body supporting seat cushion and a second component attached to the seat back. The two recliner components are coupled together for rotation relative to one another about a pivot shaft. One recliner component carries an inner spur gear, having outwardly extending teeth, while the other component carries an outer gear having inwardly directed teeth. The inner gear has at least one less tooth than the outer gear and has a diameter which is smaller than the diameter of the outer gear by at least the radial height of the outer gear teeth.

The inner gear is mounted on an eccentric so as to bias the inner gear in one direction radially relative to the outer gear. This results in meshing of gear teeth on one side and a clearance between the gear teeth on the opposite side. Rotation of the eccentric causes the area of teeth mesh to move circumferentially around the outer gear whereby the difference in the number of gear teeth produces rotation of the inner gear relative to the outer gear.

After adjustment of the seat back, the seat back is held in its adjusted position by the eccentric maintaining the meshing of the inner gear and outer teeth. The recliner is self locking in the sense that forces applied to the seat back can not cause a rotation of the eccentric and movement of the seat back. Only rotation of the eccentric by the operating handle produces a change in the seat back position. A certain amount of free play, i.e. clearance between the gear teeth is necessary for proper operation of the recliner. However, such free play can cause lateral movement of the inner gear—in other words, movement laterally along the axis of rotation. Such lateral movement can reduce the overall strength of the recliner and cause low overall product life.

Various approaches have been taken to reduce or compensate for such lateral movement. One approach is to increase the thickness of the teeth in the inner gear. However, this approach only compensates for such lateral movement and in doing so causes more cost and product packaging size to be used.

Figure 3:
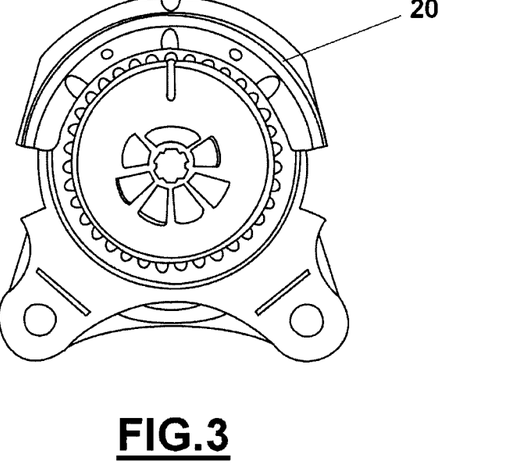
FIG. 3 is a side view of a known recliner assembly.
Figure 4:
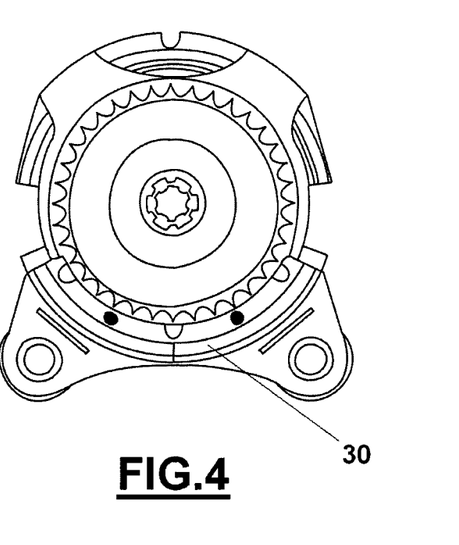
FIG. 4 is a side view of a known recliner assembly.

Another approach can be seen in FIGS. 3 and 4. Both Figures show a recliner mechanism having two separate covers added which only partially (less than 360 degrees) enclose the gears. FIG. 3 shows a partial cover 20 which is mounted to a portion of the seat back frame; however, the cover 20 only retains the inner gear for approximately 170 degrees. Similarly, the cover 30 in FIG. 4 only retains approximately 120 degrees of the outer gear.

It is an object of the present invention to provide an improved recliner which is easy to construct, eliminates lateral movement between the gears and which has high strength to resist loads during a vehicle collision.

The recliner of the present invention utilizes an inner retainer mounted to an outer gear for retaining an inner gear from lateral movement. The retainer is a one-piece construction, circular-shaped, and provides 360 degrees of support to the inner gear. Since the retainer provides 360 degrees of support to the inner gear, the construction of the gears can be less expensive reducing the overall cost of the recliner while improving performance. For example, the gears could be stamped sheet metal with teeth formed from less material thickness.

Further objects, features, and advantages of the invention will become apparent from a consideration of the following description and the appended claims when taken in connection with the accompanying drawings.

DETAILED DESCRIPTION OF THE PREFERRED EMBODIMENT

Figure 1:
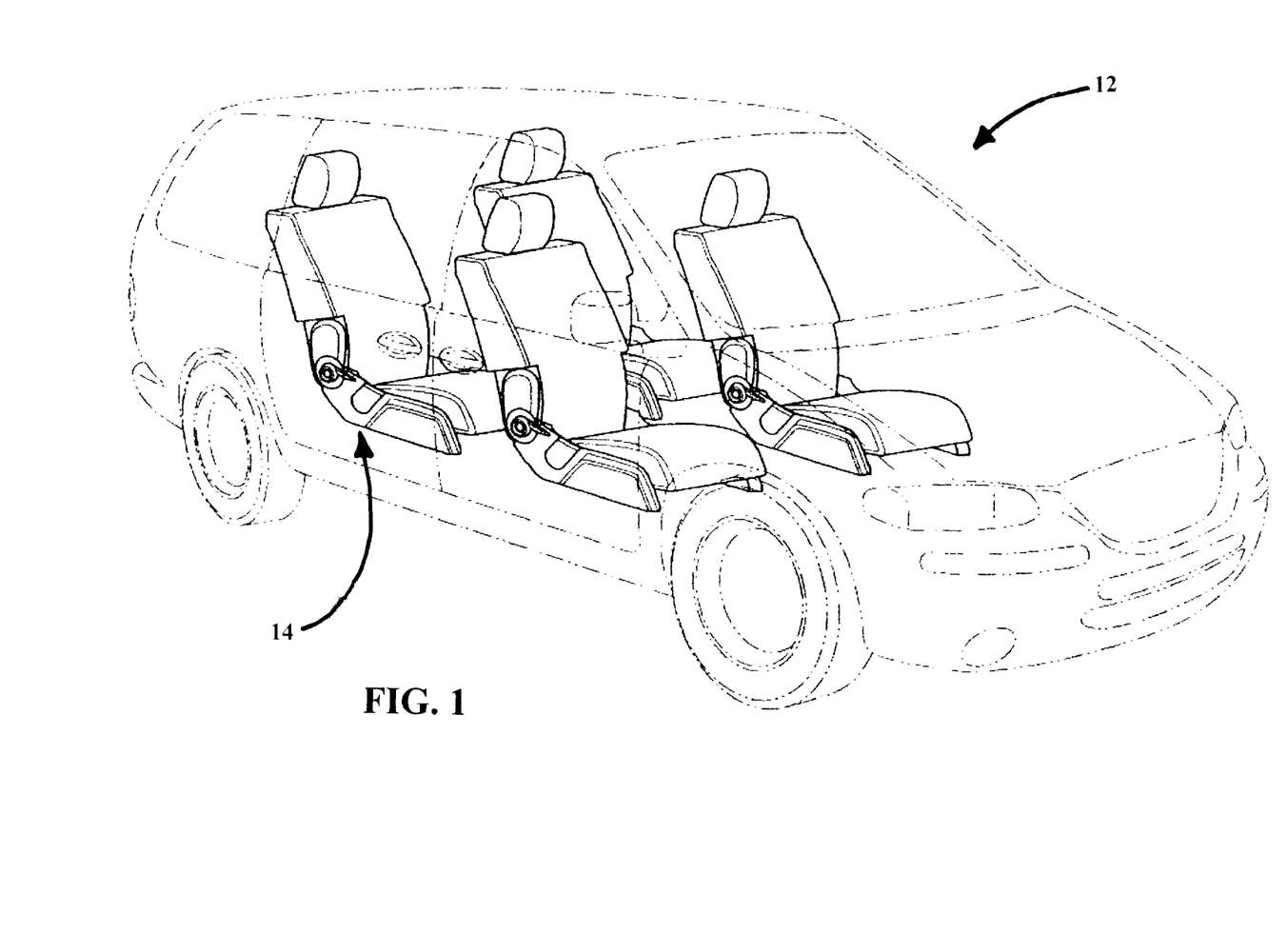
FIG. 1 is a perspective view of a motor vehicle including a seat assembly according to the subject invention.

Referring to the Figures, wherein like numerals indicate like or corresponding parts throughout the several views, an exemplary motor vehicle is shown generally at 12. The vehicle 12 is shown here in the form of a passenger van, but it will be appreciated that the vehicle type is not relevant to the invention. The vehicle 12 includes at least one seat assembly, generally indicated at 14, of the type including a backrest 16 hingedly connected to a seat cushion 18. The seat cushion 18 is anchored to the floor of the passenger compartment using any of the various anchoring techniques, such as fore and aft adjustable slides, releasable hooks, fixed mounts, and the like.

Figure 2:
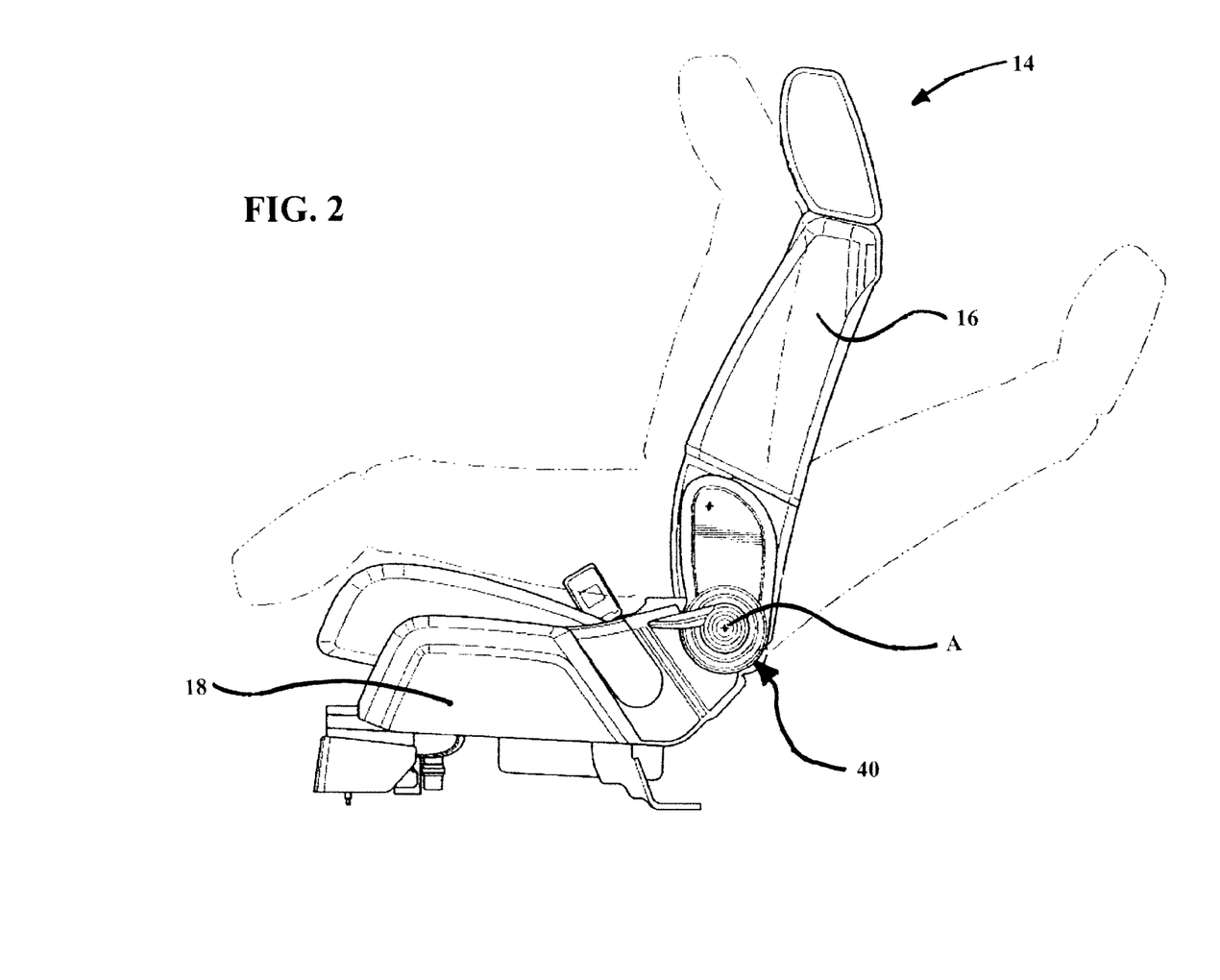
FIG. 2 is a side elevation view of a seat assembly according to the subject invention, wherein the backrest is shown in various positions.

As shown in FIG. 2, the backrest 16 is capable of reclining rearwardly to a maximum rearward condition shown in phantom. The angular orientation of the maximum rearward condition is merely exemplary, and in fact, either a greater or a lesser degree of angular tilt may be achieved according to the desired design requirement.

A rotary recliner mechanism is generally indicated at 40 in FIG. 2. The rotary recliner mechanism is located on each side of the seat assembly 14, and is of generally identical or mirror-image construction. The rotary recliner mechanism 40 is configured to establish incremental reclining adjustments about a generally horizontal first axis A. Thus, the rotary recliner mechanism 40 permits relative pivotal movement between the backrest 16 and the seat cushion 18.

Figure 5:
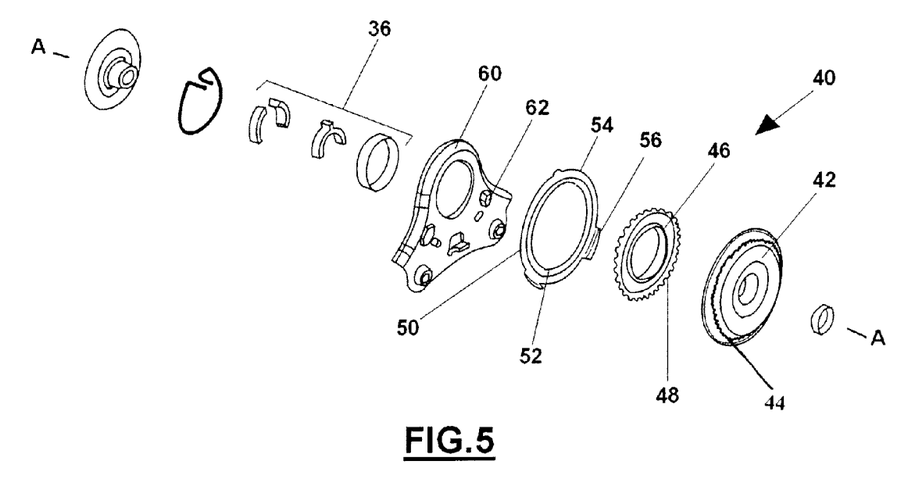
FIG. 5 is an exploded view of the subject invention

The rotary recliner mechanism 40 can accomplish incremental reclining adjustments using various tooth engaging or frictional/wedging constructions. FIG. 5 shows the rotary recliner mechanism generally at 40. The embodiment shown in FIG. 5 uses a wedging construction 36 for performing the incremental reclining adjustments. It should be appreciated that other types of adjustment constructions can be used. The rotary recliner mechanism 40 includes opposing first and second portions supported relative to one another for rotation about the axis A. The first portion is an outer gear 42 and includes internal teeth 44 arranged circumferentially about the axis A. The second portion is an inner gear 46 and includes at least one tooth engaging member 48 selectively moveable into and out of engagement with the internal teeth 44 so as to arrest relative rotation between the outer gear 42 and inner gear 46 when engaged with the internal teeth 44. Conversely, when the tooth engaging member 48 is disengaged from the internal teeth 44, relative rotation between the first and second portions is permitted.

The rotary recliner mechanism 40 includes a retainer 50 configured for attachment to the outer gear 42. The retainer 50 is shaped circular having an inner flange 52 and an outer flange 54. The inner flange 52 is formed to include an inner diameter which is less than an outer diameter of the inner gear 46 so as to provide an overlapping surface of the inner flange 52 with the inner gear 46. This overlapping relationship extends circumferentially around the inner gear 46 to provide 360 degrees of lateral support to the inner gear 46. The outer flange 54 is formed for mating with the outer gear 42. The outer flange 54 of the retainer 50 also includes at least one detent 56 for interacting assisting with stopping the rotation of the recliner.

It has been found that a rotary recliner mechanism including a retainer 50 configured to retain the inner gear 46 provides a more durable recliner since the interaction of the inner gear 46 with the outer gear 42 is maintained circumferentially about axis A instead of the prior known recliners having retainers affording only partial support about axis A. Further, since this lateral support is improved it is possible to form the inner gear 46 using less material thickness thereby reducing weight, cost, and assembly package size.

The rotary recliner mechanism 40 includes a base plate 60 fixed relative to the seat cushion 18. The base plate 60 is fixedly joined to one of the inner and outer gears of the recliner mechanism 40. FIG. 5 shows the base plate 60 configured for attachment with the inner gear 46. In this embodiment, base plate 60 includes maximum travel stops 62 for interaction with the detent 56 on the retainer 50. In operation, in the event that the rotation of the seat base to the back rest exceeds a predetermined limit, the detent 56 bottoms-out on the travel stops 62 of the base plate to aid with stopping such rotation.

The rotary recliner mechanism 40 further includes a top plate (not shown) that is pivotally supported relative to the base plate 60 for movement about the axis A. The top plate is fixedly joined to one of the other of the inner and outer gears of the recliner mechanism for relative arcuate displacement about the axis A. FIG. 5 shows the outer gear 42 configured for attachment to the top plate.

Figure 6:
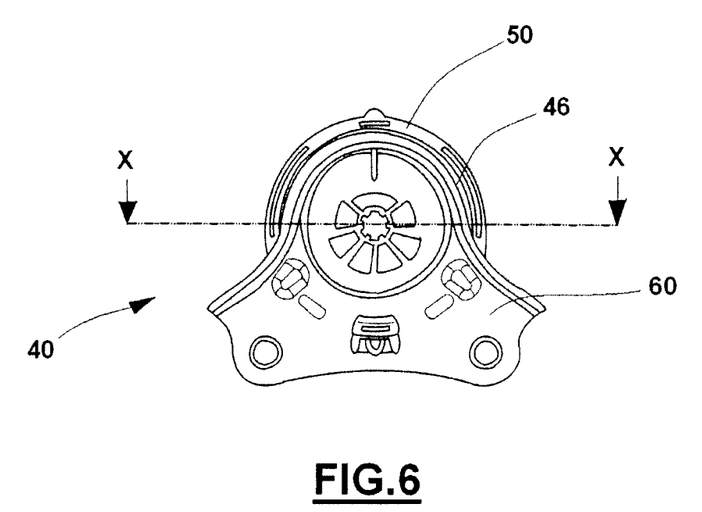
FIG. 6 is a side view of the subject invention.
Figure 7:
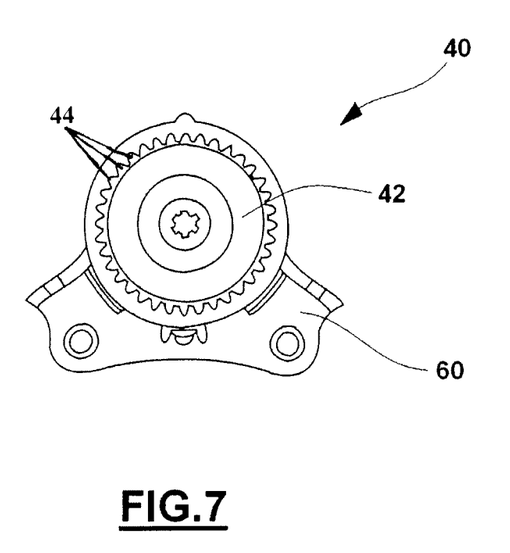
FIG. 7 is a side view of the subject invention.

FIGS. 6 and 7 show the recliner mechanism 40 in the assembled state having the base plate 60 and without the top plate. The retainer 50 is shown attached to the outer gear 42 and extending around the inner gear 46.

Figure 8:
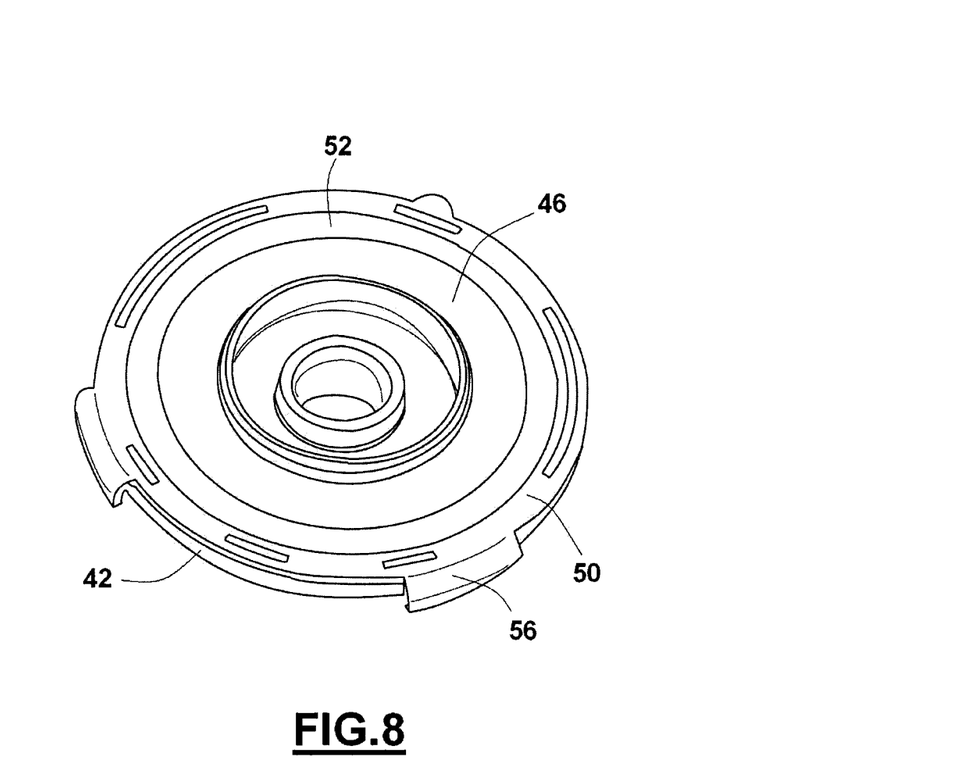
FIG. 8 is a perspective view of the subject invention.

FIG. 8 shows the inner gear 46 placed in mating relationship with the outer gear 42 and the retainer 50 attached to the outer gear 42. The retainer 50 is provided for support circumferentially 360 degrees around the inner gear 46. The retainer 50 is shown with the inner flange 52 overlapping a portion of the inner gear 46. The retainer 50 is also shown with the detents 56 as described above.

Figure 9:
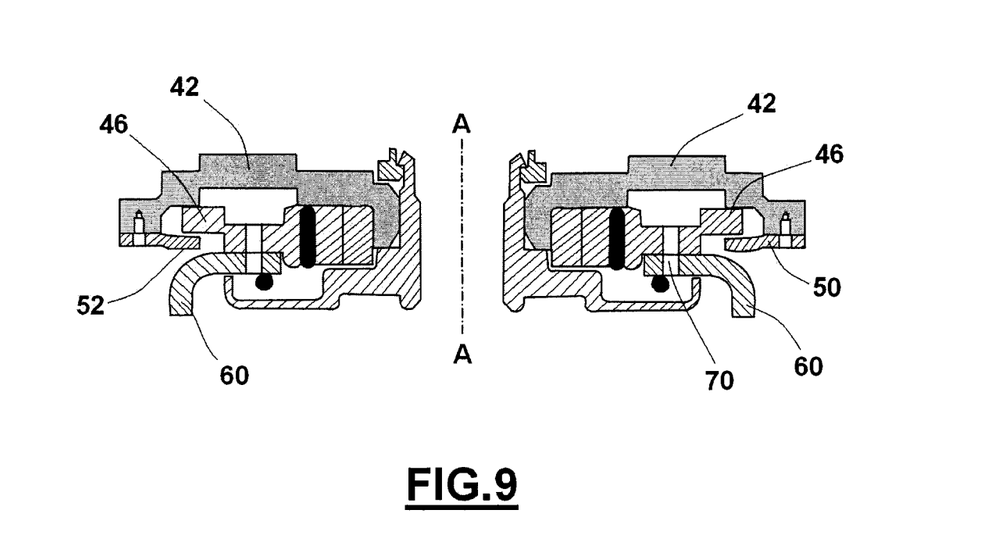
FIG. 9 is a sectional view of the subject invention taken along line A-A of FIG. 8.

FIG. 9 also shows the overlapping and lateral supporting relationship of the retainer 50 to the inner gear 46. More specifically, the inner flange 52 includes an inner diameter which is less than the outer diameter of the inner gear 46 thereby defining an overlap to retain the inner gear 46 laterally from moving axially along the axis A. Also shown in FIG. 9 is the inner gear 46 attached to the base plate 60 at 70.

Figure 10:
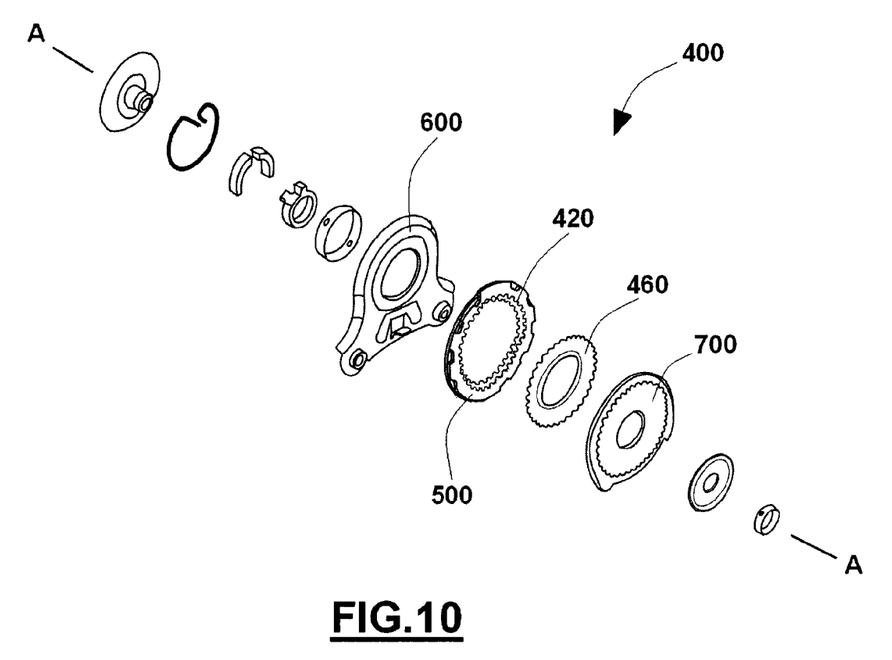
FIG. 10 is an exploded view of another embodiment of the subject invention.

Another embodiment of the rotary recliner mechanism is shown generally at 400 in FIG. 10. The embodiment shown in this FIG. 10 is similar to the embodiment shown in FIG. 5 except that the inner gear and outer gears are formed differently. It is important to note that the retainer 500, like the other embodiment disclosed, is attached to an outer gear 420 for retaining an inner gear 460.

Figure 11:
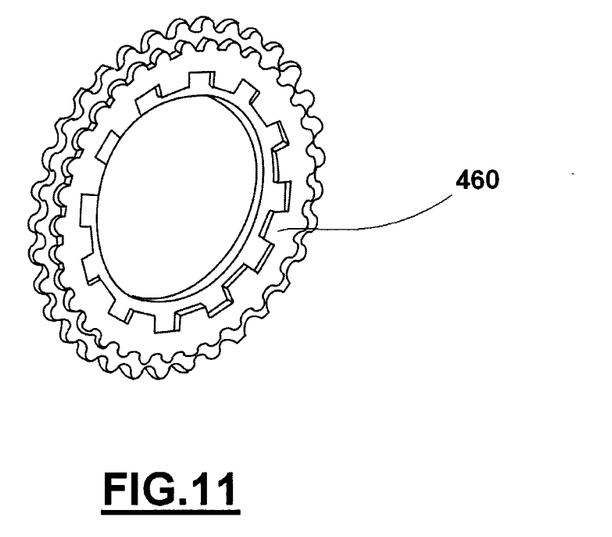
FIG. 11 is an exploded view of an inner gear assembly.
Figure 12:
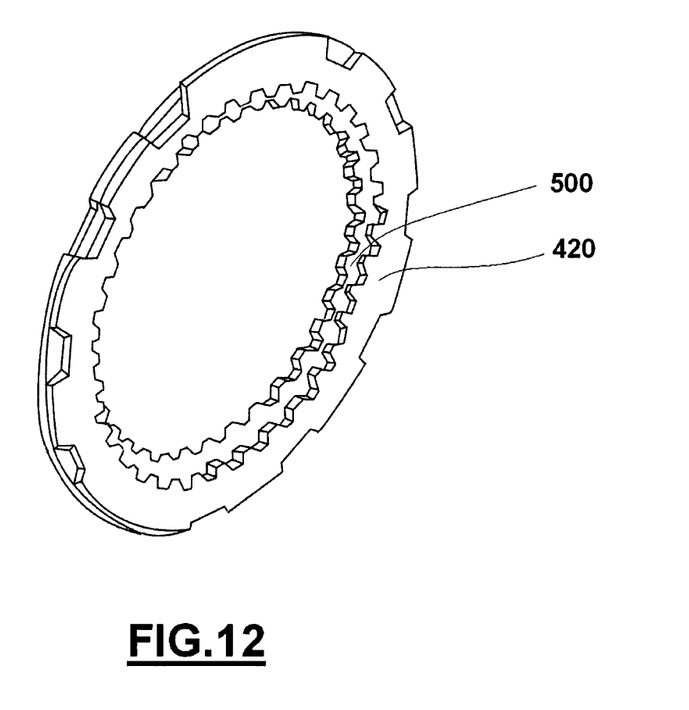
FIG. 12 is an exploded view of an outer gear assembly.

In this embodiment, the inner gear 460 is formed by mating two plates together such as by welding, as seen in FIG. 11. Similarly, the outer gear 420 shown in FIG. 12 is attached to the retainer 500 such as by welding. The two-piece inner gear 460, retainer 500, and the outer gear 420 are formed by a fine-blanking process from a HSLA steel material. The fine-blanking process involves the precise use of dies, clamps, and cutting tools to provide a finally formed part. Using this fine-blanking process and the HSLA material permits these components to be manufactured with less process steps and more precision while reducing costs. During this process, no heat-treating is required thereby reduced processing steps and warpage of the product. Further, by using the fine-blanking process without any heat treatment, the formed parts can be welded together to achieve the most appropriate assembled strength.

Figure 13:
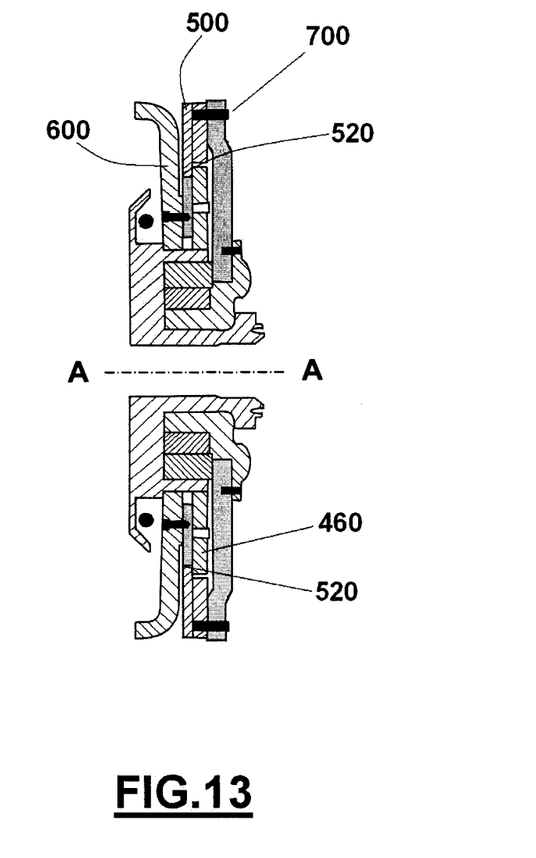
FIG. 13 is a section view of the subject invention taken along a mid-point of the second embodiment.

FIG. 13 is a sectional view of this second embodiment of the subject invention taken along a mid-point in the rotary recliner mechanism 400 showing both the base plate 600 and a top plate 700. As described above, the base plate 600 is attached to the seat base (not shown) and to the inner gear 460. The top plate 700 is attached to the back rest (not shown) and to the outer gear 460. Similar to the other embodiment, the retainer 500 includes an inner flange 520 overlapping a portion of the inner gear 460 to retain the inner gear 460 from lateral movement.

Figure 14:
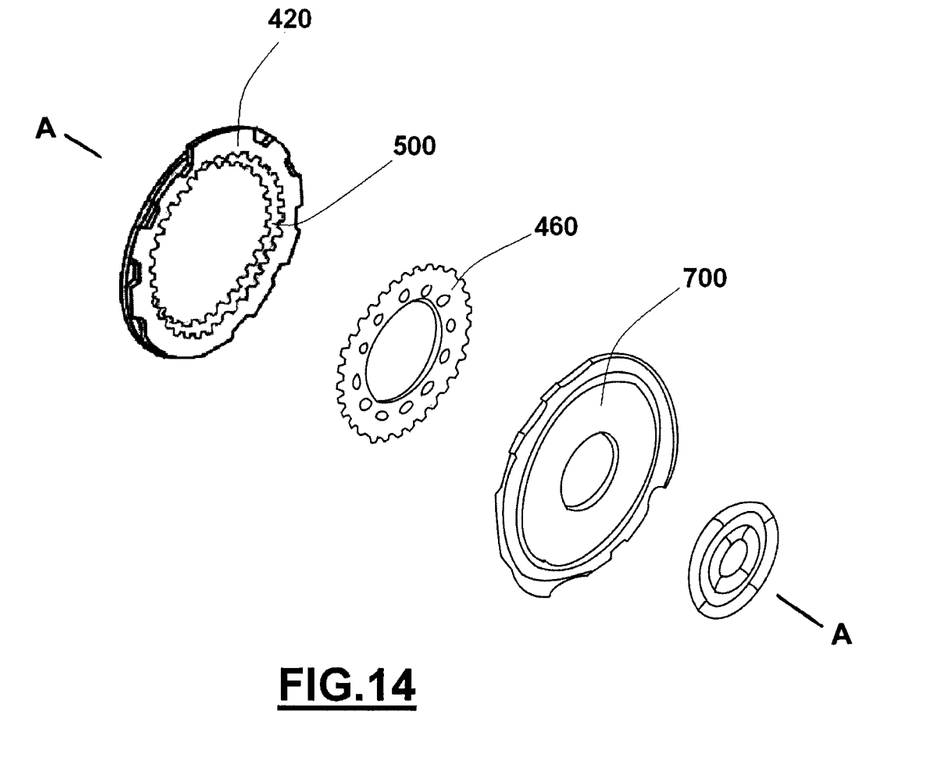
FIG. 14 is an exploded view of a portion of the subject invention partially assembled.
Figure 15:
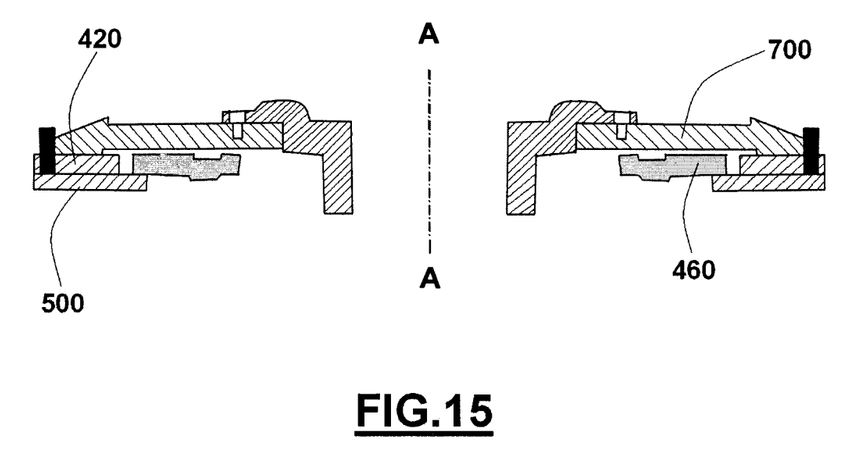
FIG. 15 is a sectional view of a portion of the subject invention taken from FIG. 14.
Figure 16:
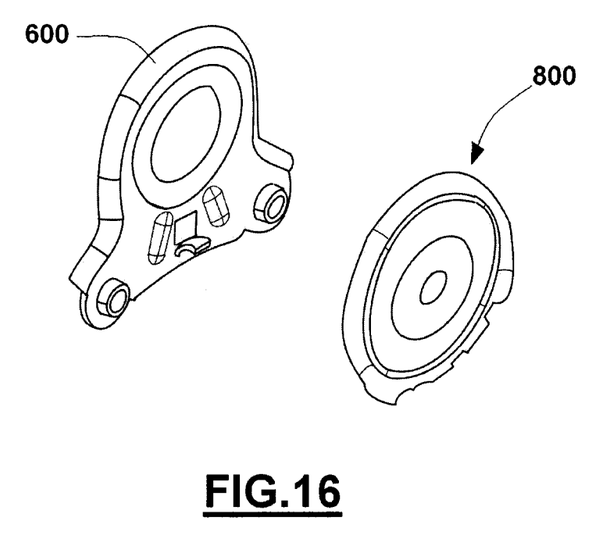
FIG. 16 is an exploded view of a portion of the subject invention partially assembled.
Figure 17:
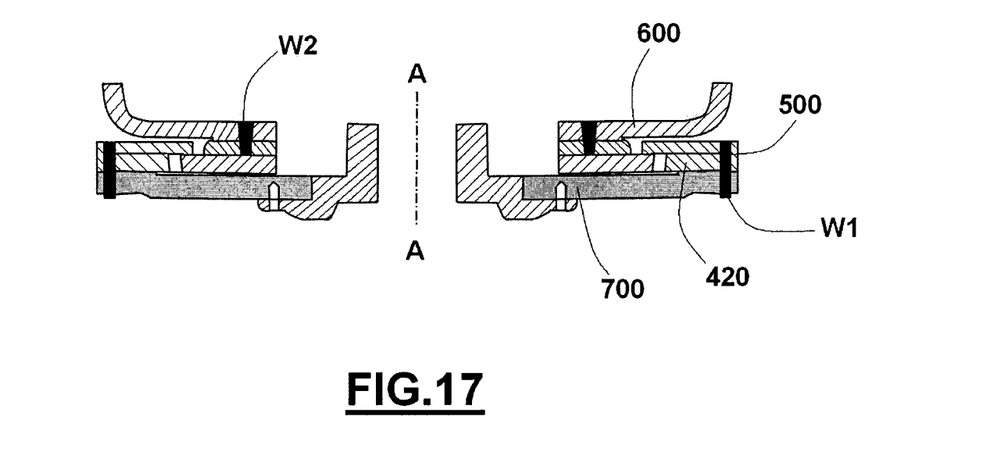
FIG. 17 is a sectional view of a portion of the subject invention taken from FIG. 16.

FIGS. 14-18 show the method of assembling the rotary recliner mechanism 400. FIG. 14 shows the retainer 500 attached to the outer gear 420, the top plate 700, and the inner gear 460. In this embodiment, the top plate 700 is aligned along axis A. The inner gear 460 is also aligned along axis A and placed adjacent to the top plate 700. The retainer 500 is welded to the outer gear 420 and together, both the retainer 500 and the outer gear 420 are aligned to axis A and welded to the top plate 700 as shown in FIG. 15. The inner gear 460 shown in FIG. 15 is a one-piece inner gear 460; however, it should be appreciated that in some cases a two-piece inner gear may be utilized. As shown in FIGS. 16 and 17, this assembly shown generally at 800 comprising the top plate 700, inner gear 460, outer gear 420, and retainer 500 is aligned along axis A in alignment with the base plate 600 and the base plate 600 is welded to the inner gear 420. FIG. 17 shows the inner gear 460 including a two-piece construction, as discussed above. Like the outer gear 420 and the retainer 500 were attached together before final assembly, this two-piece inner gear 460 is also pre-assembled together by, for example, welding the two portions of the inner gear together.

Figure 18:
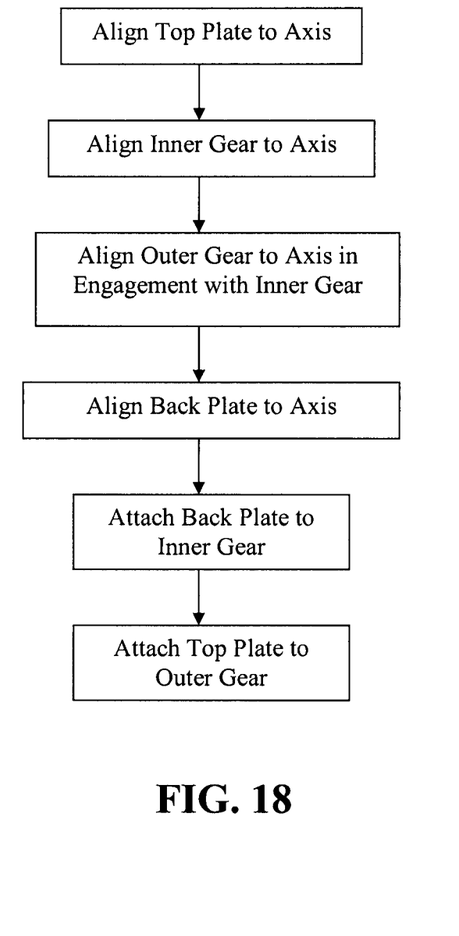
FIG. 18 is a diagram showing the method of assembling the subject invention.

FIG. 18 shows a diagram of the assembly operation of the rotary mechanism 400, as described above. The assembly operation involves the alignment of each component in a particular order about axis A and the attachment of each component together. Attachment of the components can vary but it has been found that the pre-assembly of certain components such as the retainer 500 to the outer gear 420, along with both pieces of a two-piece inner gear 460 is most cost effective. First, the top plate 700 is aligned along axis A and may be attached to a fixture (not shown) for holding the entire assembly as it is assembled. The inner gear 460, including even in the case the inner gear 460 is a two-piece construction as shown in FIG. 17, is aligned on axis A and adjacent the top plate 700. The outer gear 420 is attached to the retainer 500 as a pre-assembly and the outer gear 420 is aligned on the axis A in engagement with the inner gear 460. The base plate 600 is placed on the retainer plate and inner gear, and aligned with axis A. The back plate 600 is welded to the pre-assembly including the two-piece inner gear, as seen at W2 in FIG. 17. The top plate 700 is welded to the pre-assembly including the outer gear 420 and the retainer 500, as seen at W1 in FIG. 17. It is possible that both welds W1 and W2 can be conducted simultaneously to reduce processing time. It should be appreciated that in following this method, the welding operation does not occur between more than two component parts.

It is to be understood that the invention is not limited to the exact construction illustrated and described above, but that various changes and modifications may be made without departing from the spirit and scope of the invention as defined in the following claims.

The foregoing invention has been described in accordance with the relevant legal standards, thus the description is exemplary rather than limiting in nature. Variations and modifications to the disclosed embodiment may become apparent to those skilled in the art and fall within the scope of the invention.

What is claimed is:

1. A recliner assembly for a vehicular seat of the type including a backrest hingedly connected to a seat cushion and capable of being rotated, said assembly comprising:
 a toothed rotary recliner mechanism configured to establish incremental reclining adjustments about a generally horizontal axis to permit relative pivotal movement between a backrest and a seat cushion, said rotary recliner mechanism including opposing inner and outer gears supported relative to one another for rotation about said axis, said outer gear including internal teeth arranged circumferentially about said first axis and facing said axis, and said inner gear including at least one tooth engaging member facing away from said first axis and selectively moveable into and out of engagement with said internal teeth so as to arrest relative rotation between said inner and outer gears when engaged with said internal teeth;
 a base plate configured for fixed connection to the seat cushion and a top plate configured for fixed connection to the backrest, said base plate being fixedly joined to one of said inner and outer gears, and said top plate being fixedly joined to the other of said inner and outer gears of said recliner mechanism for relative arcuate displacement about said first axis;
 a retainer configured for fixed connection to said outer gear; and
 wherein said retainer plate is configured to retain said inner gear laterally with respect to said outer gear,
 wherein the retainer has an outer flange including at least one detent extending toward said base plate and wherein said base plate includes maximum travel stops for interaction with said detent on the retainer, and in operation, in the event that the rotation of said base plate to backrest of the seat exceeds a predetermined limit, said detent bottoms-out on said maximum travel stops to aid with stopping the rotation.

2. The assembly of claim 1 wherein said retainer is substantially circular and extending adjacent a first surface of said inner gear.

3. The assembly of claim 2 wherein said first surface of said inner gear extends 360 degrees.

4. The assembly of claim 3 wherein said retainer retains said inner gear substantially about the first surface.

5. The assembly of claim 4 wherein said retainer is mounted to said outer gear.

6. The assembly of claim 4 wherein said retainer includes an inner surface extending circumferentially for contact with said first surface of said inner gear.

7. The assembly of claim 5 wherein said outer gear is mounted to said top plate.

8. The assembly of claim 7 wherein said outer gear includes a profile for mating engagement with a corresponding profile on said top plate.

9. The assembly of claim 4 wherein said retainer is mounted to said outer gear and said top plate.

10. The assembly of claim 9 wherein said retainer is welded to said outer gear and said top plate.

11. The assembly of claim 1 wherein said inner gear includes a first plate configured for connection with the base plate and a second plate fixed connected thereto for engagement with the outer gear.

12. The assembly of claim 10 wherein said first plate and second plate of said inner gear is welded together.

13. The assembly of claim 11 wherein said inner gear having a first plate and second plate welded together is welded to said base plate.

14. The assembly of claim 1 wherein at least one of said inner gear, outer gear, and retainer are formed by a fine-blanking process.

15. A method of producing a recliner assembly for a vehicular seat, the method comprising the steps of:
 aligning a top plate along an axis of rotation;
 aligning an inner gear concentrically along said axis of rotation in spaced relation to said top plate and having external teeth facing away from said axis of rotation;
 aligning an outer gear concentrically along said axis of rotation and at least partially engaged with said inner gear and having internal teeth facing said axis of rotation;
 aligning a base plate concentrically along said axis of rotation;
 attaching said base plate to said inner gear;
 attaching said top plate to said outer gear; and
 wherein said outer gear includes a retainer extending adjacent to said inner gear,
 wherein said retainer has an outer flange including at least one detent, said base plate includes maximum travel stops for interaction with said detent on said retainer, and in operation, in the event that the rotation of said base plate to backrest of the seat exceeds a predetermined limit, said detent bottoms-out on said maximum travel stops to aid with stopping the rotation.

16. The method of claim 15 further comprising the steps of attaching said retainer to said outer gear.

17. The method of claim 16 further comprising the steps of attaching said retainer to said outer gear and said outer gear to said top plate simultaneously.

18. The method of claim 17 further comprising the steps of simultaneously attaching said inner gear to said base plate.

19. The method of claim 18 further comprising the steps of forming said inner gear by attaching a first plate to a second plate.

* * * * *